United States Patent [19]
Gallagher et al.

[11] Patent Number: 5,954,374
[45] Date of Patent: Sep. 21, 1999

[54] PIPE CONNECTORS

[75] Inventors: John Gallagher, Stonehaven; Norman Lumsden, Aberdeen, both of United Kingdom

[73] Assignee: Oil States Industries (UK) Ltd., Aberdeen, United Kingdom

[21] Appl. No.: 08/839,341

[22] Filed: Apr. 18, 1997

[30] Foreign Application Priority Data

Apr. 26, 1996 [GB] United Kingdom ............. 9608709

[51] Int. Cl.⁶ .................................................. F16L 25/00
[52] U.S. Cl. ......................... 285/332; 285/334; 285/382; 285/382.2
[58] Field of Search .................... 285/333, 334, 285/355, 390, 332, 382, 382.1, 382.2; 403/343

[56] References Cited

U.S. PATENT DOCUMENTS

| | | | |
|---|---|---|---|
| 2,051,499 | 8/1936 | Siegle ...................................... | 285/333 |
| 2,587,544 | 2/1952 | Sneddon ................................. | 285/333 |
| 2,671,949 | 3/1954 | Welton ................................. | 285/334 X |
| 3,114,566 | 12/1963 | Coberly et al. ..................... | 285/334 X |
| 4,121,862 | 10/1978 | Greer ...................................... | 285/333 |
| 4,298,221 | 11/1981 | McGugan . | |
| 4,561,683 | 12/1985 | Lumsden et al. . | |
| 4,629,221 | 12/1986 | Lumsden et al. . | |
| 4,648,627 | 3/1987 | Reimert ............................... | 285/334 X |
| 4,770,448 | 9/1988 | Strickland et al. ..................... | 285/333 |

FOREIGN PATENT DOCUMENTS

| | | |
|---|---|---|
| 2033518 | 5/1980 | United Kingdom . |
| 1573945 | 8/1980 | United Kingdom . |
| 2099529 | 12/1982 | United Kingdom . |
| 2113335 | 8/1983 | United Kingdom . |
| 2138089 | 10/1984 | United Kingdom . |

*Primary Examiner*—Dave W. Arola
*Attorney, Agent, or Firm*—Watson Cole Grindle Watson, P.L.L.C.

[57] ABSTRACT

A pipe connector includes a tubular pin member having a generally frusto-conical outer peripheral surface and a tubular box member having a generally frusto-conical inner peripheral surface corresponding to the frusto-conical outer peripheral surface of the pin member and overlies the frusto-conical surface of the pin member when the members are fully engaged together. The members include with inter-engageable annular projections and grooves on the said peripheral surfaces for axially locking the members together when they are fully engaged together, the projections and grooves being spaced apart along the surfaces. Means are provided for supplying hydraulic fluid under pressure between the overlying parts of the surfaces of the members when fully engaged together to expand the box member and/or contract the pin member to bring the projections out of engagement with the corresponding grooves and permit the members to be disengaged. The members include means for radially restraining the free end of at least one of the members of the connector and the extent of the radial overlap at full engagement of at least the projections and grooves in the region of the free end of the one member and the corresponding inner end of the other member is reduced relative to that in the region of the centre of the connector.

37 Claims, 6 Drawing Sheets

PIPE CONNECTORS

BACKGROUND OF THE INVENTION

Field of the Invention

The present invention relates to improvements in pipe connectors, particularly but not exclusively for use in the oil industry, for connecting metal pipe sections of a pipe string. More particularly, the invention relates to improvements in the type of pipe connector described in GB1573945, GB2033518, GB2099529, GB2113335 and GB2138089.

This type of pipe connector includes a tubular pin member having a generally frusto-conical outer peripheral surface and a tubular box member having a generally frusto-conical inner peripheral surface corresponding to the frusto-conical outer peripheral surface of the pin member. In use the two members, each associated with a pipe section, are telescoped together and are axially locked together by inter-engageable annular projections and grooves provided on the peripheral surfaces, the projections and grooves being spaced apart along the two surfaces.

In telescoping the two members together, they are initially telescoped until surface contact is made between crest surfaces of the projections and surfaces between the grooves at least at the ends of the overlapped portions of the surfaces. Hydraulic fluid under pressure may then be supplied between the overlapped parts of the surfaces to expand the box member and/or contract the pin member to permit the members to be fully telescoped together, or the members may simply be pushed together. Pressurised hydraulic fluid is also used to disengage the members by expanding the box member and/or contracting the pin member to bring the projections out of engagement with the corresponding grooves.

In order to reduce the axial extent of the members, projections and grooves may be provided which have relatively small axial extents but this means that, to fully telescope the members together after they have been brought into initial contact, it is necessary to move individual projections past at least one groove before each projection is aligned with the groove in which it is designed to engage. In doing this, there is a risk that the projections and grooves may inter-engage before the members are fully telescoped together and it may then prove impossible to disengage the projections and grooves. To avoid this, some at least of the projections and grooves have different axial extents so that the projections and grooves cannot inter-engage before the members are fully engaged. The arrangement is such that in all intermediate positions of the members, prior to fill engagement and after the frusto-conical surfaces have been brought into initial surface contact, there is contact between the crests of at least some of the projections and surfaces between the grooves spaced apart along the overlying parts of the frusto-conical surfaces.

In the connectors described in the above referred to patent specifications, the projections and grooves have a constant radial height and depth and the crest and root surfaces of the projections and grooves lie on frusto-conical surfaces all of which have the same conicity.

In the connector described in GB2138089, the projections and grooves are spaced from the ends of the frusto-conical surfaces of the members and sealing means for sealing between the surfaces are provided at or adjacent the ends of the surfaces in conjunction with means radially restraining the free ends of the members. As described, the members may be provided at their free ends with axially projecting annular nibs which engage in grooves in the corresponding member to increase sealing at the ends of the frusto-conical surfaces to ensure that there is no loss, or no significant loss, of pressure in the hydraulic fluid used to disengage the members.

However, it is found that, particularly with this type of connector, when disengaging the members using pressurised hydraulic fluid, to ensure that the end projections and grooves at the end of the surfaces of the members disengage completely despite the radial restraint, the radial extent of disengagement of the projections and grooves in the central parts of the surfaces of the members is substantially greater than is needed to disengage these projections from their grooves. This means that the pressure of the hydraulic fluid required to disengage the pin and box members is relatively high. Since the resulting expansion and/or contraction of the members must not exceed the elastic limit of the material of the members, the members have to be made from high tensile steel.

SUMMARY OF THE INVENTION

According to one aspect of the present invention, there is provided a pipe connector including a tubular pin member having a generally frusto-conical outer peripheral surface and a tubular box member having a generally frusto-conical inner peripheral surface corresponding to the frusto-conical outer peripheral surface of the pin member and which overlies the frusto-conical surface of the pin member when the members are fully engaged together, the members being provided with inter-engageable annular projections and grooves on the peripheral surfaces for axially locking the members together when they are fully engaged together, the projections and grooves being spaced apart along the surfaces, means for supplying hydraulic fluid under pressure between the overlying parts of the surfaces of the members when fully engaged together to expand the box member and/or contract the pin member to bring the projections out of engagement with the corresponding grooves and permit the members to be disengaged, and means for radially restraining the free end of one of the members of the connector, wherein the extent of the radial overlap at full engagement of at least the projections and grooves in the region of the free end of the one member and the corresponding inner end of the other member is reduced relative to that in the region of the centre of the connector.

Preferably the radial overlap progressively reduces in the direction from the centre towards the one end of the connector.

According to another aspect of the present invention, the root surfaces of the grooves and surfaces between the projections of the two members lie on cones having substantially the same cone angle and the radial extents of the projections and/or grooves vary along the length of the surface of at least one of the members.

According to another aspect of the present invention, the crest surfaces of the projections of one member at least in one end portion of the frusto-conical surface of the member lie on a cone having a larger cone angle than that of the cone enveloping the remainder of the crest surfaces of the projections. The surfaces between the end grooves at least in one end portion of the frusto-conical surface of the member provided with grooves may lie on a cone having a larger cone angle than that of the cone enveloping the remainder of the surfaces between the grooves.

In one embodiment this is achieved by arranging that the surfaces between the grooves involved and at the roots of the grooves, and the surfaces between the projections involved, all lie on cones having substantially the same cone angle, the crest surfaces of the projections lying on a surface which may be conical with a different cone angle or curved. In the alternative, the surface enveloping the surfaces between the grooves may be adjusted to provide the reduction in radial overlap.

This reduction in radial overlap may affect up to half the projections and grooves but preferably affects only about a quarter.

Where the free ends of both of the members of the connector are radially restrained, the reduction in radial overlap is provided at both ends of the connector and may be obtained by adjusting the radial extent of the projections or grooves at both ends of one member or one end of each member, preferably the free end of each member.

According to a further aspect of the present invention, the surfaces between the projections on the one member lie on a first cone and the crest surfaces of the projections in one end portion of the frusto-conical surface lie on a second cone and in the other end portion lie on a third cone, the first and third cones having the same cone angle and the second cone having a larger cone angle, the one end being that towards the free end of the member and the other end being that towards that connected to a pipe section. The projections whose crests lie on the second cone may extend up to about half-way along the surface provided with projections, but preferably extend about a quarter of the way along the surface, the projections on the remainder of the surface having crest surfaces conforming to the third cone. The grooves of the other member may be correspondingly shaped with the roots of the grooves lying on a fourth cone having the same angle as the first cone and the surfaces between the grooves in one end portion of the frusto-conical surface of the member lying on a fifth cone and at the other on a sixth cone, the angles of the fourth and sixth cones being the same and smaller than that of the fifth cone. The surfaces conforming to the fifth cone are towards the free end of the member and may extend up to about half-way along the length of the surface of the member provided with the grooves, but preferably extend about a quarter of the way along the surface. The member provided with the projections may be the pin member or the box member.

BRIEF DESCRIPTION OF THE DRAWINGS

Further features and advantages of the present invention will become apparent from the following description of an embodiment thereof given by way of example only with reference to the accompanying drawings, in which.

DETAILED DESCRIPTION OF THE PREFERRED EMBODIMENTS

Figures 1, 1A, 1B:
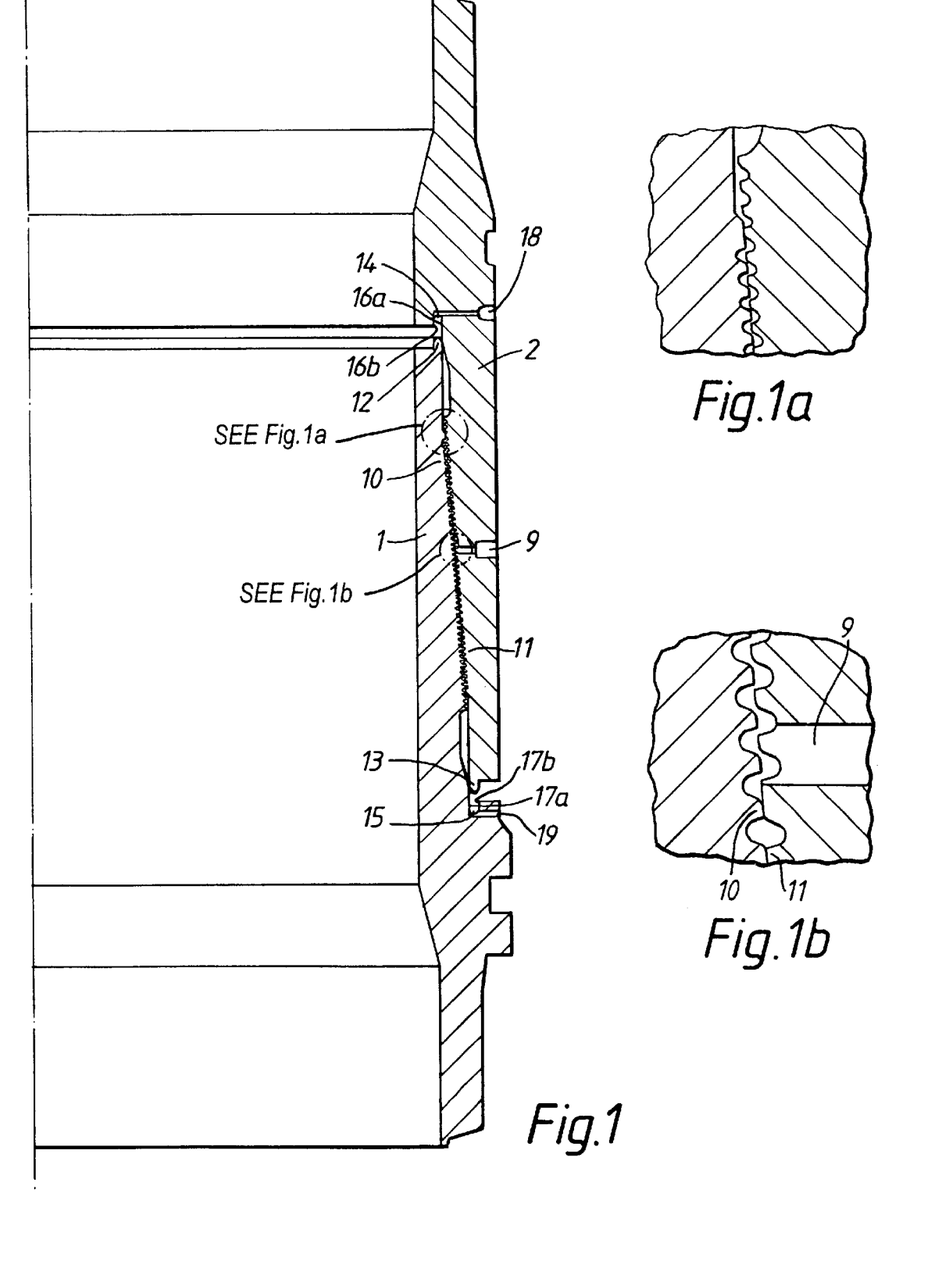
FIG. 1 is an axial section through an embodiment of pipe connector showing the members in their initial telescoped together positions.
Figure 2:
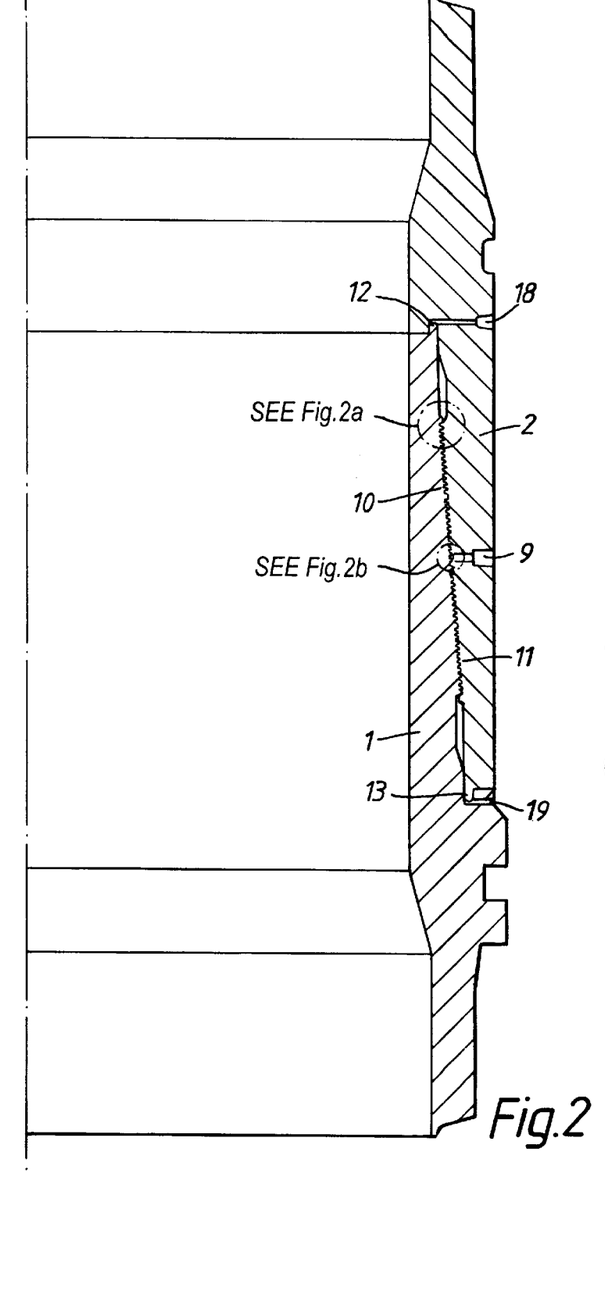
FIG. 2 is a section similar to that of FIG. 1 but showing the members fully engaged together.
Figure 2A:
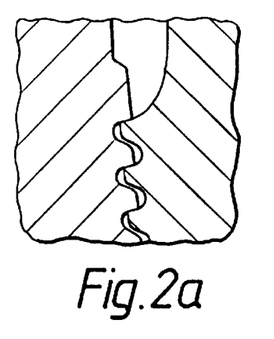
Figure 2B:
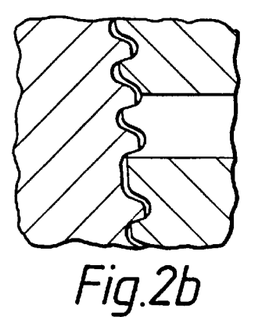

FIGS. 1 and 2 show a pipe connector comprising a tubular pin member 1 and a tubular box member 2, which are connected, or to be connected e.g. by welding, to the ends of two pipes. The members are designed to be telescoped together, the outer surface 3 of the pin member 1 and the inner surface 4 of the box member 2 being both generally frusto-conical and provided with annular projections 5 and grooves 6 which are axially spaced apart along the lengths of the surfaces intermediate the ends of the surfaces. The projections and grooves are relatively dimensioned so that, when the members are fully engaged together, corresponding ones of the projections inter-engage in the grooves to axially lock the members together. Pin member 1 is described herein as having projections 5 and box member 2 as having grooves 6, but it will be understood that these descriptions can be reversed.

Engagement of the members takes place in two stages. Initially, the members are brought together until contact is established between crest surfaces 7 of the projections 5 and surfaces 8 between the grooves 6. Thereafter, force is applied axially to complete engagement of the members. At the end of the first stage, a projection may yet have to pass over a plurality, for example three or four, grooves before it reaches its corresponding groove in which it is to engage. With this arrangement, to prevent inadvertent engagement of a projection with a groove which is not its corresponding groove, i.e. before the members are fully telescoped together, corresponding pairs of projections and grooves may be provided with differing axial extents and spacings along the length of the surfaces 3, 4. The projections 5 and grooves 6 are then arranged, for example as described in GB 2113335, so that at intermediate positions during telescoping of the members 3, 4, after the members have been brought into initial contact, at least some of the crest surfaces 7 of projections 5 spaced along the length of the surface 1 and intermediate the ends of the overlapped portions of the surfaces 3, 4, are aligned with surfaces 8 between the grooves, to prevent premature inter-engagement of the projections and grooves over any substantial length of the overlapped portions of the surfaces.

The arrangement and axial dimensioning of the spaced annular projections and grooves to prevent intermediate inter-engagement of the projections and grooves can be obtained in any number of different ways, for example as described in GB2113335.

After the members have been telescoped together to their initial positions, they may be fully engaged by simply applying an axial force to the members. Engagement may however be assisted by the application of pressurised hydraulic fluid to the overlapped portions of the surfaces, and the members may be disengaged in the same way, the pressurised fluid expanding the box and/or contracting the pin to permit engagement and disengagement, and lubricating the crest surfaces 7 of the projections 5 and surfaces 8 between the grooves 6 to facilitate sliding of these surfaces over one another. For this purpose, the box member 2 is provided with a radial duct 9 for connection to a source of pressurised hydraulic fluid. The duct 9 opens inwardly of the box into the region of the frusto-conical surface 4 of the box which is provided with the projections or grooves. To ensure that the hydraulic fluid is able to flow along the full length of the overlapped portions of the surfaces of the members provided with the grooves, axially extending grooves 10, 11 are provided, one in the pin member 1 and the other in the box member 2, the duct 9 opening into the groove 11 in the box member.

To ensure sealing at the ends of the frusto-conical surfaces 3, 4 of the members and to guard against any inadvertent escape of the pressurised hydraulic fluid from between the members during disengagement of the members, sealing means may be provided at or adjacent the ends of the frusto-conical surfaces 3, 4 and the sealing means may be provided in conjunction with means radially restraining the free ends of the members. As shown, the sealing and radially restraining means comprise an annular axially extending nib or projection 12, 13 provided at the free end of each member and which is received in a corresponding groove 14, 15 at the inner end of the frusto-conical surface of the other member, and, as shown, seals laterally against surface portions 16a and 16b, 17a and 17b of the groove of the other member, surface portions 16a, 16b, 17a and 17b being provided with appropriate tapers for this purpose. In effect, each nib 12,. 13 is in full interference fit in its corresponding groove 14, 15, when the members are fully engaged together. Surface portions 16a and 17a are extended along the surfaces of the members so that the nibs 12, 13 make sealing contact with these surfaces before the members are fully engaged and indeed, in their initial telescoped positions to provide seals at the ends of the overlapped portions of the frusto-conical surfaces during assembly of the members. Ducts 18, 19 connecting the bottoms of the grooves 14, 15 with the exterior of the members are provided to allow hydraulic fluid to bleed away during assembly of the connector to ensure that the fluid does not become trapped between the members and thus prevent full engagement. Sealing between the ribs and the grooves may alternatively be achieved in a variety of different ways, for example, as described in GB2138089.

In the pipe connectors described in GB1573945, GB2033518, GB2099529, GB2113335 and GB2138089, the crest surfaces 7 of the projections 5, the surfaces between the projections, the root surfaces of the grooves 6 and the surfaces 8 between the grooves, all lie on conical surfaces which have substantially the same conicity so that, when the members are fully engaged together, the radial extent of the overlap between the engaged projections and grooves is the same over the full axial extent of the surfaces provided with projections and grooves.

Figure 3:
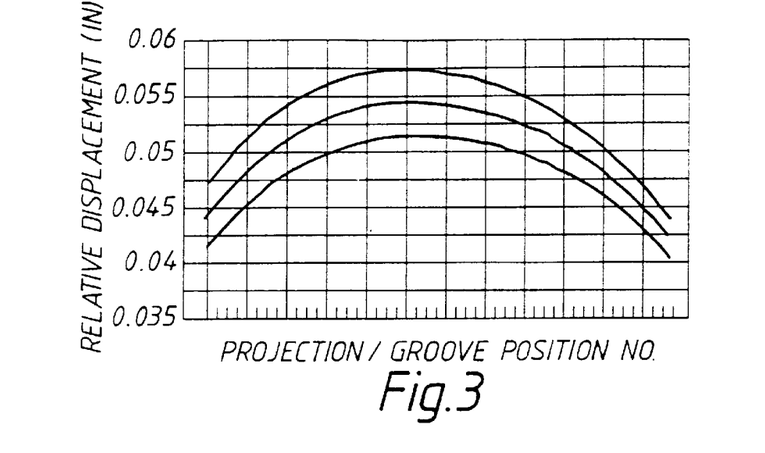
FIG. 3 is a graph showing the radial displacement between projections and grooves during disengagement of the members of a known connector.

However, with this arrangement it is found that, in disengaging the members to ensure that the end ones of the radial projections adjacent the or each end of the member which is radially restrained disengage fully from the grooves, the pressure of the hydraulic fluid applied to the connector has to be relatively high and, indeed, much higher than is required to disengage the projections from the grooves in the central part of the surfaces. The extent of disengagement or relative axial displacement between the projections and grooves along the lengths of the members of FIGS. 1 and 2 is shown in FIG. 3. Because any expansion of the pin member and/or contraction of the box member to disengage the projections from the grooves must be within the elastic limits of the material from which the members are made, the material required for the connector has to have a greater tensile strength than might otherwise be required for the connector.

Accordingly, the extent of the radial overlap at full engagement of at least the end projections and grooves in the region of the or each free end of the or each member which is radially restrained, is reduced with a view to reducing the pressure of the hydraulic fluid required to disengage the members. As shown, the reduction in radial overlap is obtained by reducing the radial extents of the projections in an end portion at least of the part of the surface of the pin member provided with the projections, and the radial depths of the grooves in an opposite end portion at least of the part of the surface of the box member provided with the grooves. The reduction may be progressive in a direction from the centre towards the end of the member and may extend over at least a quarter and up to half of the part of the surface provided with the projections or grooves concerned. Preferably, the crest surfaces of the projections and the surfaces between the grooves in these portions of the surfaces of the members lie on conical surfaces which have substantially the same cone angle and a cone angle which is greater than that of the cones enveloping the remainder of the crest surfaces of the projections, the surfaces between the projections, the remainder of the surfaces between the grooves and the root surfaces of the grooves.

Figure 4:
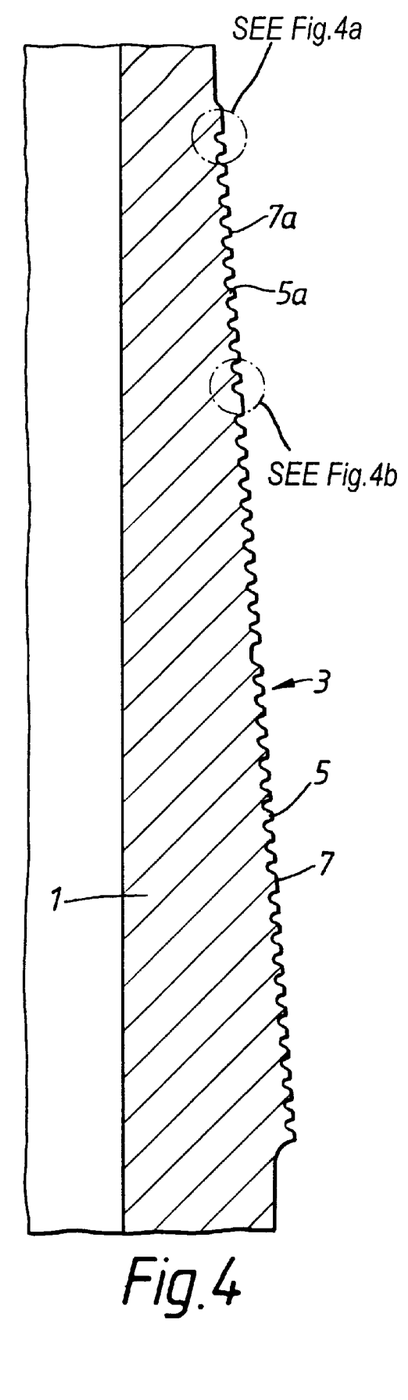
FIGS. 4 and 5 are axial sections of the pin and box members respectively of the connector shown in FIGS. 1 and 2.
Figure 4A:
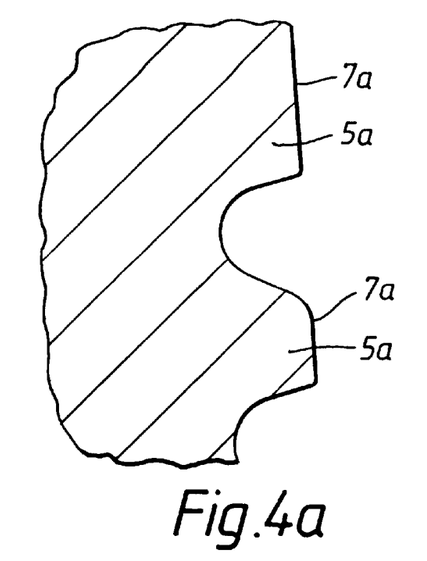
Figure 4B:
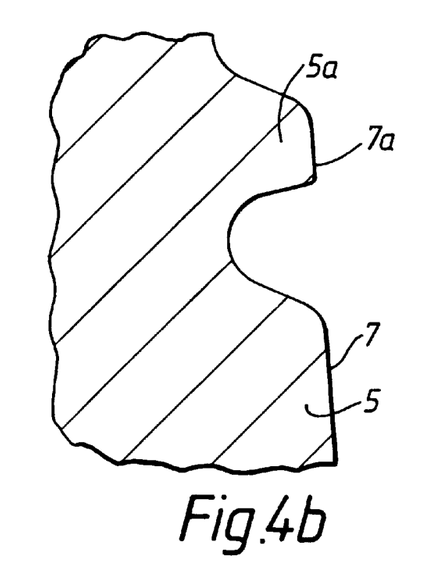
Figures 5, 5A, 5B:
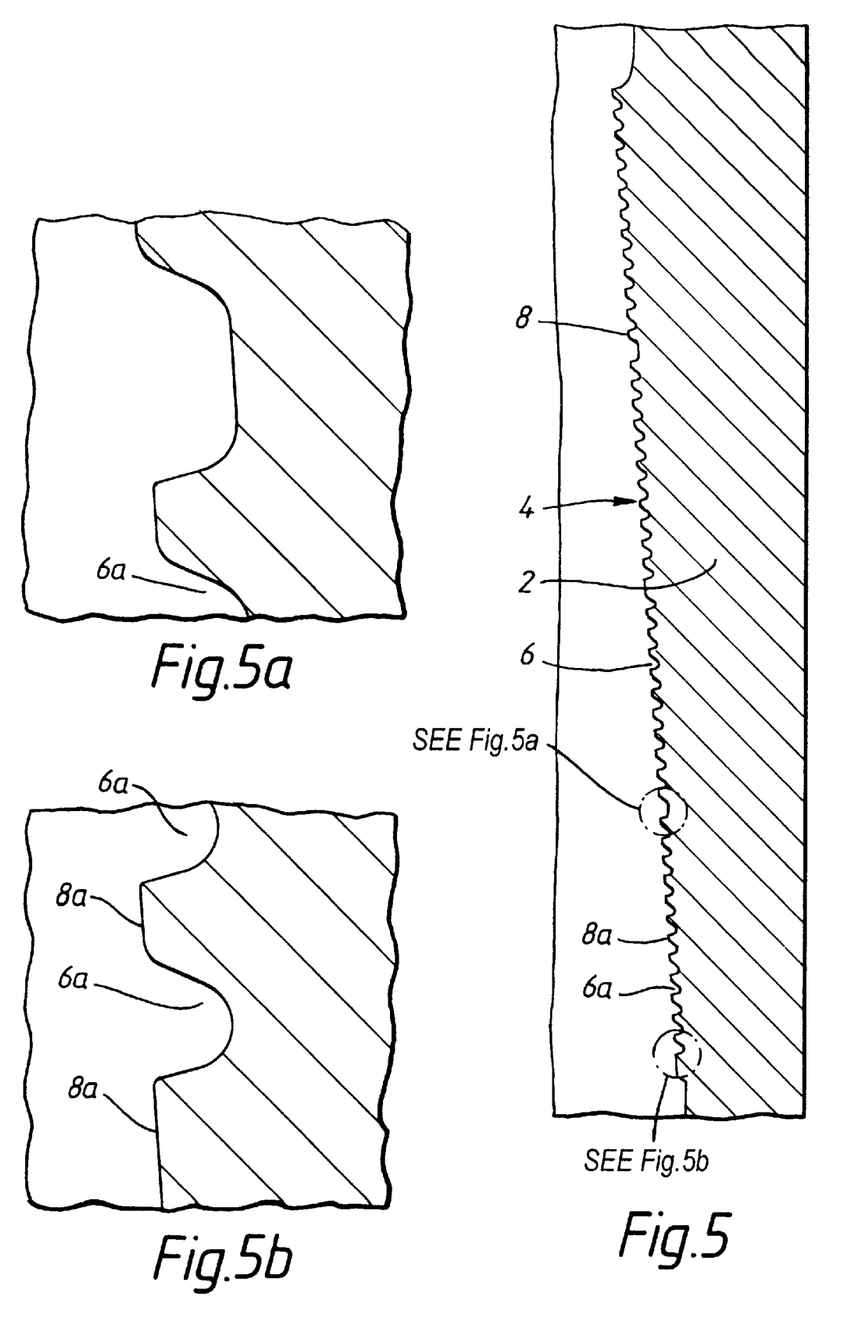

FIGS. 4 and 5 show in greater detail parts of the pin member 1 and of the box member 2 of the connector shown in FIGS. 1 and 2. As shown the crest surfaces 7a of the projections 5a at the end portion of the surface of the pin member 1 adjacent its free end lie on a cone which has a cone angle, e.g. of the order of 0.14° larger, than the angle of the cone enveloping the crest surfaces 7 of the rest of the projections 5, which is the same as the angle of the cone enveloping the surfaces between all of the projections 5 and 5a. The cone angle of the latter cone may, for example, be 4°. The surfaces 8a between the grooves 6a in the opposite end portion of the surface of the box member 2 similarly are enveloped by a cone whose angle is similarly slightly larger than the angle of the cone enveloping the surfaces 8 between the rest of the grooves 6 and that enveloping the root surfaces of all of the grooves 6 and 6a.

Preferably about a quarter of the projections and a quarter of the grooves may have a reduced radial extent, but up to half may be affected. As shown the last 6 projections out of 24 have a reduced radial extent and the last 6 grooves out of 24 have a reduced radial depth.

Figure 6:
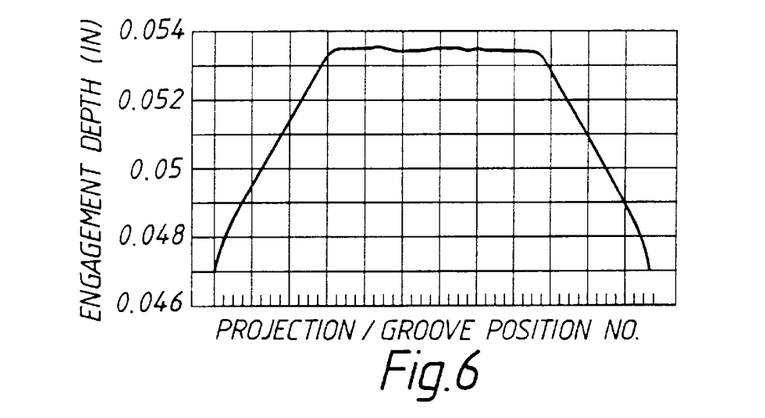
FIG. 6 is a graph showing the extent of radial overlap of the projections and grooves of the connector of FIGS. 1 and 2.
Figure 7:
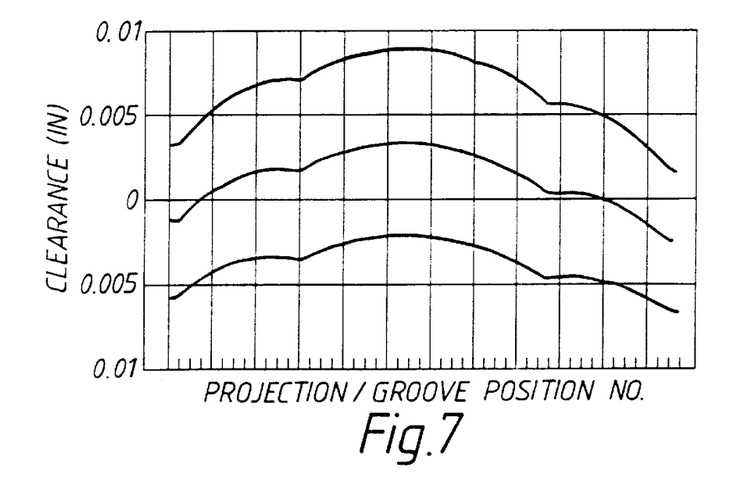
FIG. 7 is a graph similar to that of FIG. 3 but of the connector of FIGS. 1 and 2.

FIG. 6 shows how the radial overlap of the projections in the grooves on full engagement of the members shown in FIGS. 4 and 5 varies along the length of the surfaces of the members and FIG. 7 shows the relative extent of radial disengagement of the projections 5 and 5a from the grooves 6a and 6 along the axial extent of the surfaces of the members provided with the projections and grooves.

As previously indicated, this will have the effect that, for disengagement of the members, the pressure of the hydraulic fluid required to achieve this can be reduced. If hydraulic fluid is used to engage the members, the pressure can also be reduced.

When the members are telescoped together into their initial relative positions, crest surfaces 7 along the length of the surfaces provided with projections and grooves will come into abutment but there will not necessarily be abutment between all of the crest surfaces which are aligned with surfaces 8 between the grooves. The effect of the reduction in radial extent of some of the projections and grooves will mean that there is a slight clearance between some of the aligned surfaces. However, with the arrangement shown in FIGS. 4 and 5, the clearance will be small, for example of the order of 0.005". If the members are engaged together using pressurised hydraulic fluid, it is considered that the clearance between aligned surfaces will be sufficiently small that there will not be a significant pressure loss before sufficient expansion/contraction in the centre of the overlapped portions of the members has taken place to bring these aligned surfaces sufficiently into contact to provide adequate sealing.

In disengaging the members, sealing is initially and mainly provided by the nibs 12 and 13 sealing against the surfaces 16, 17.

It will be appreciated that the reduction in radial overlap between the projections and grooves is only required in those projections and grooves closest to a free end of a member which is radially restrained relative to the other member, and that the reduction needs to be greatest for the projection or groove closest to the free end and progressively reducing away from the free end. As described above, this progressive reduction is achieved by reducing the radial extents of the projections or grooves so that the crest surfaces 7a of the projections 5a concerned or surfaces 8a between the grooves 6a concerned lie on a cone having a different cone angle to that of the remainder of the corresponding surfaces. In a modification shown in FIG. 8, the crest surfaces 7a of the projections concerned or surfaces 8a between the grooves concerned lie on a curved surface rather than a straight-sided surface.

Figure 8:
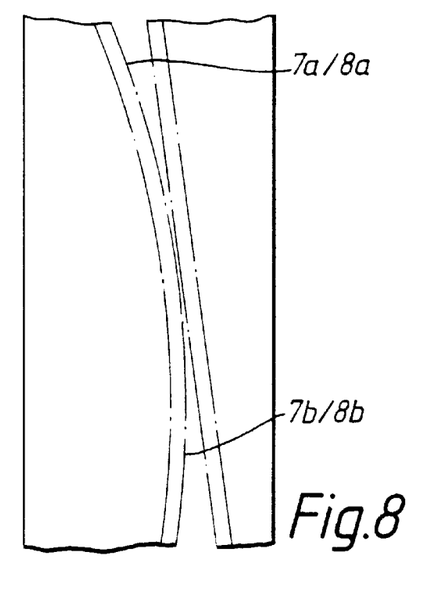
FIGS. 8 and 9 are diagrammatic section views through a pin and box connector showing modifications.
Figure 9:
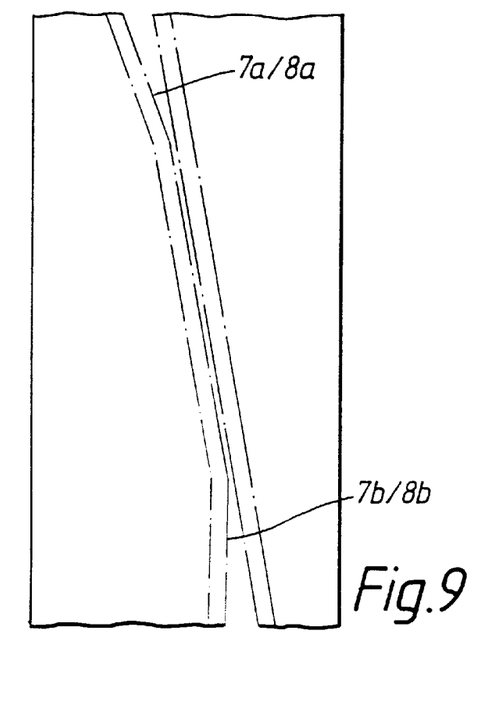

As described above, the reduction in radial overlap is achieved by reducing the radial extent of the projections or grooves adjacent the free end of the member whose free end is radially restrained. In the alternative, the grooves 6b or projections 5b at the root end of the other member may be modified to reshape the envelope of the surfaces 7b or 8b of these projections or grooves. In this wavy where the free ends of both members are radially restrained, the radial extent of the projections or (grooves in one only of the members may be modified, as shown in FIGS. 8 and 9, the grooves or projections of the other member being unaffected and having a constant radial extent from one end to the other of the member.

What is claimed is:

1. A pipe connector comprising:
   a tubular pin member having a generally frusto-conical outer peripheral surface and a free end;
   a tubular box member having a generally frusto-conical inner peripheral surface and a free end, the inner peripheral surface corresponding to the frusto-conical outer peripheral surface of the pin member and overlying the frusto-conical surface of the pin member when the members are fully engaged together, the members being provided with inter-engagable annular projections and grooves on said peripheral surfaces for axially locking the members together when they are fully engaged together, pairs of the projections and Pairs of the grooves being respectively spaced apart along the frusto-conical peripheral surfaces by spacing surfaces therebetween, and the projections and grooves having respective crest and root surfaces;
   means for supplying hydraulic fluid under pressure between the overlying parts of the surfaces of the members when fully engaged together to at least one of expand the box member and contract the pin member so as to bring the projections out of engagement with the corresponding grooves and permit the members to be disengaged;
   means for sealing the inner and outer surfaces in a region of the free ends of the members when hydraulic fluid is supplied; and
   means for radially restraining the free end of one of the members, wherein the extent of the radial overlap at full engagement of at least the projections and grooves in the region of the free end of the one member and the corresponding inner end of the other member is reduced relative to that in the region of the center of the connector.

2. A pipe connector as claimed in claim 1, wherein the extent of the said radial overlap progressively reduces in the direction from the centre towards the free end of the one member and the corresponding inner end of the other member.

3. A pipe connector as claimed in claim 1, wherein the root surfaces of the grooves and spacing surfaces between the projections of the two members lie on cones having substantially the same cone angle and the said reduction in radial overlap is obtained by varying the radial extents of the projections along the length of the surface of the member provided with the projections.

4. A pipe connector as claimed in claim 3, wherein the crest surfaces of the projections adjacent the free end of the one member which is provided with the projections lie on a cone having a larger cone angle than that of the cone enveloping the crest surfaces of the adjacent projections.

5. A pipe connector as claimed in claim 3, wherein the crest surfaces of the projections adjacent the corresponding inner end of the other member provided with projections lie on a cone having a smaller cone angle that than of the cone enveloping the crest surfaces of the adjacent projections.

6. A pipe connector as claimed in claim 1, wherein the root surfaces of the grooves and spacing surfaces between the projections of the two members lie on cones having substantially the same cone angle and the said reduction in radial overlap is obtained by varying the radial extents of the grooves along the length of the surface of the member provided with the grooves.

7. A pipe connector as claimed in claim 6 wherein the spacing surfaces between the grooves adjacent the corresponding inner end of the other member which is provided with the grooves lie on a cone having a smaller cone angle than that of the cone enveloping the spacing surfaces between the grooves of the adjacent grooves.

8. A pipe connector as claimed in claim 6, wherein the spacing surfaces between the grooves adjacent the free end of the one member provided with grooves lie on a cone having a larger cone angle than that of the cone enveloping the spacing surfaces between the grooves of the adjacent grooves.

9. A pipe connector as claimed in claim 1 wherein the root surfaces of the grooves and spacing surfaces between the projections of the two members lie on cones having substantially the same cone angle and the said reduction in radial overlap is obtained by varying the radial extents of the projections and the radial extents of the grooves along the lengths of the surfaces of the members.

10. A pipe connector as claimed in claim 1, wherein the root surfaces of the grooves and the spacing surfaces between the projections lie on cones having substantially the same cone angle, the crest surfaces of the projections adjacent the free end of the one member lying on a conical surface with a different cone angle.

11. A pipe connector as claimed in claim 1, wherein the root surfaces of the grooves and the spacing surfaces between the projections lie on cones having substantially the same cone angle, the crest surfaces of the projections or surfaces between the grooves adjacent the free end of the one member lying on a curved surface.

12. A pipe connector as claimed in claim 1, wherein the said reduction in radial overlap affects at least a quarter of at least one of the projections and the grooves adjacent the free end of the one member.

13. A pipe connector as claimed in claim 1, comprising means for radially restraining the free ends of both of the members, the radial extent of radial overlap at full engagement of the projections and grooves adjacent both ends of the members being reduced relative to that in the centre of the connector.

14. A pipe connector as claimed in claim 13, wherein the root surfaces of the grooves and spacing surfaces between the projections of the two members lie on cones having substantially the same cone angle and the said reduction in radial overlap at both ends of the members is obtained by varying the radial extents of the projections of one of the members adjacent both ends of the one member.

15. A pipe connector as claimed in claim 13, wherein the root surfaces of the grooves and spacing surfaces between the projections of the two members lie on cones having substantially the same cone angle and the said reduction in radial overlap is obtained by varying the radial extents of the projections at one end of one member and by varying the radial extents of the grooves or projections at the other end of the other member.

16. A pipe connector as claimed in claim 13, wherein the root surfaces of the grooves and spacing surfaces between the projections of the two members lie on cones having substantially the same cone angle and the said reduction in radial overlap at both ends of the members is obtained by varying the radial extents of the grooves of one of the members adjacent both ends of the one member.

17. A pipe connector as claimed in claim 13, wherein the root surfaces of the grooves and spacing surfaces between the projections of the two members lie on cones having substantially the same cone angle and the said reduction in radial overlap is obtained by varying the radial extents of the grooves at one end of one member and by varying the radial extents of the grooves at the other end of the other member.

18. A pipe connector as claimed in claim 1, wherein the projections and grooves are provided with relatively small axial extents such that, to fully telescope the members together after they have been brought into initial contact, individual projections move past at least one groove before each projection is aligned with the groove in which it is designed to engage.

19. A pipe connector as claimed in claim 1, wherein at least some of the projections and grooves have at least one of different axial extents and spacings so that the projections and grooves cannot inter-engage before the members are fully engaged.

20. A pipe connector as claimed in claim 1, wherein in all intermediate positions of the members, prior to full engagement and after the frusto-conical surfaces have been brought into initial surface contact, there is contact between the crests of at least some of the projections and surfaces between the grooves spaced apart along the overlying parts of the frusto-conical surfaces.

21. A pipe connector as claimed in claim 1, wherein the root surfaces of the grooves and the spacing surfaces between the projections lie on cones having substantially the same cone angle, the spacing surfaces between the grooves adjacent the free end of the one member lying on a conical surface with a different cone angle.

22. A pipe connector as claimed in claim 1, wherein said means for sealing the inner and outer surfaces are located at said free ends of said members.

23. A pipe connector as claimed in claim 1, wherein said means for sealing the inner and outer surfaces are located adjacent said free ends of said members.

24. A pipe connector comprising:
a tubular pin member having a generally frusto-conical outer peripheral surface and a free end;
a tubular box member having a generally frusto-conical inner peripheral surface and a free end, the inner peripheral surface corresponding to the frusto-conical outer peripheral surface of the pin member and overlying the frusto-conical surface of the pin member when the members are fully engaged together, the members being provided with inter-engagable annular projections and grooves on said peripheral surfaces for axially locking the members together when they are fully engaged together, pairs of the projections and pairs of the grooves being respectively spaced apart along the frusto-conical peripheral surfaces by spacing surfaces therebetween, and the projections and grooves having respective crest and root surfaces;
a duct to supply hydraulic fluid under pressure between the overlying parts of the surfaces of the members when fully engaged together to at least one of expand the box member and contract the pin member so as to bring the projections out of engagement with the corresponding grooves and permit the members to be disengaged;
sealing structures in a region of the free ends of the members to provide seals between the inner and outer surfaces when hydraulic fluid is supplied; and
interconnecting formations to radially restrain the free end of one of the members, wherein the extent of the radial overlap at full engagement of at least the projections and grooves in the region of the free end of the one member and the corresponding inner end of the other member is reduced relative to that in the region of the center of the connector.

25. A pipe connector as claimed in claim 24, wherein said sealing structure for sealing the inner and outer surfaces are located at said free ends of said members.

26. A pipe connector as claimed in claim 24, wherein said sealing structure for sealing the inner and outer surfaces are located adjacent said free ends of said members.

27. A pipe connector comprising:
a tubular pin member having a generally frusto-conical outer peripheral surface and a free end;
a tubular box member having a generally frusto-conical inner peripheral surface and a free end, the inner peripheral surface corresponding to the frusto-conical outer peripheral surface of the pin member and overlying the frusto-conical surface of the pin member when the members are fully engaged together, the members being provided with inter-engagable annular projections and grooves on said peripheral surfaces for axially locking the members together when they are fully engaged together, pairs of the projections and pairs of the grooves being respectively spaced apart along the frusto-conical peripheral surfaces by spacing surfaces therebetween, and the projections and grooves having respective crest and root surfaces;
means for supplying hydraulic fluid under pressure between the overlying parts of the surfaces of the members when fully engaged together to at least one of expand the box member and contract the pin member so as to bring the projections out of engagement with the corresponding grooves and permit the members to be disengaged;
means for sealing the inner and outer surfaces in a region of the free ends of the members when hydraulic fluid is supplied; and means for radially restraining the free ends of both of the members, wherein the spacing surfaces between the projections on one member lie on a free cone and the crest surfaces of the projections in one end portion of the frusto-conical surface of the one member lie on a second cone and in the central portion lies on a third cone, the first and third cones having the same cone angle and the second cone having a larger cone angle, the one end portion being that adjacent the free end of the one cone member.

28. A pipe connector as claimed in claim 27, wherein the projections whose crest surfaces lie on the second cone include at least a quarter of the projections.

29. A pipe connector as claimed in claim 27, wherein the crest surfaces of the projections in the other end portion of the frusto-conical surface of the one member lie on a fourth cone having a smaller cone angle than that of the first and third cones.

30. A pipe connector as claimed in claim 29, wherein the projections whose crest surfaces lie on the fourth cone include at least a quarter of the projections.

31. A pipe connector as claimed in claim 27, wherein the grooves of the other member correspond in shape to the received projection, and the root surfaces of the grooves lying on a fourth cone having the same cone angle as the first cone and the surfaces between the grooves in the end portion of the frusto-conical surface of the other member adjacent the free end of the other member lying on a fifth cone and at least in the central portion on a sixth cone, the angles of the fourth and sixth cones being the same and smaller than that of the fifth cone.

32. A pipe connector as claimed in claim 31, wherein the spacing surfaces between the grooves conforming to the fifth cone include about a quarter of the said surfaces.

33. A pipe connector as claimed in claim 27, wherein said means for sealing the inner and outer surfaces are located at said free ends of said members.

34. A pipe connector as claimed in claim 27, wherein said means for sealing the inner and outer surfaces are located adjacent said free ends of said members.

35. A pipe connector comprising:

a tubular pin member having a generally frusto-conical outer peripheral surface and a free end;

a tubular box member having a generally frusto-conical inner peripheral surface and a free end, the inner peripheral surface corresponding to the frusto-conical outer peripheral surface of the pin member and overlying the frusto-conical surface of the pin member when the members are fully engaged together, the members being provided with inter-engagable annular projections and grooves on said peripheral surfaces for axially locking the members together when they are fully engaged together, pairs of the projections and pairs of the grooves being respectively spaced apart along the frusto-conical peripheral surfaces by spacing surfaces therebetween, and the projections and grooves having respective crest and root surfaces;

a duct to supply hydraulic fluid under pressure between the overlying parts of the surfaces of the members when fully engaged together to at least one of expand the box member and contract the pin member to bring the projections out of engagement with the corresponding grooves and permit the members to be disengaged;

sealing structures in a region of the free ends of the members to provide seals between the inner and outer surfaces when hydraulic fluid is supplied; and interconnecting formations to radially restrain the free ends of both of the members, wherein the surfaces between the projections on one member lie on a free cone and the crest surfaces of the projections in one end portion of the frusto-conical surface of the one member lie on a second cone and in the central portion lies on a third cone, the first and third cones having the same cone angle and the second cone having a larger cone angle, the one end portion being that adjacent the free end of the one cone member.

36. A pipe connector as claimed in claim 35, wherein said sealing structure for sealing the inner and outer surfaces are located at said free ends of said members.

37. A pipe connector as claimed in claim 35, wherein said sealing structure for sealing the inner and outer surfaces are located at said free ends of said members.

* * * * *